(12) United States Patent
Feng et al.

(10) Patent No.: US 9,057,892 B2
(45) Date of Patent: Jun. 16, 2015

(54) THERMOCHROMATIC ELEMENT AND THERMOCHROMATIC DISPLAY DEVICE

(71) Applicant: Beijing FUNATE Innovation Technology Co., LTD., Beijing (CN)

(72) Inventors: Chen Feng, Beijing (CN); Li Qian, Beijing (CN); Yu-Quan Wang, Beijing (CN)

(73) Assignee: Beijing FUNATE Innovation Technology Co., LTD., Beijing (CN)

( * ) Notice: Subject to any disclaimer, the term of this patent is extended or adjusted under 35 U.S.C. 154(b) by 224 days.

(21) Appl. No.: 13/874,467

(22) Filed: Apr. 30, 2013

(65) Prior Publication Data

US 2014/0104671 A1    Apr. 17, 2014

(30) Foreign Application Priority Data

Oct. 15, 2012 (CN) .......................... 2012 1 03893381

(51) Int. Cl.
*G02F 1/01* (2006.01)

(52) U.S. Cl.
CPC .................................. *G02F 1/0147* (2013.01)

(58) Field of Classification Search
USPC ....................................................... 359/288
See application file for complete search history.

(56) References Cited

U.S. PATENT DOCUMENTS

| 6,287,485 | B1 * | 9/2001 | Akashi et al. ................. 252/583 |
| 7,933,058 | B2 * | 4/2011 | Liu et al. ....................... 359/288 |
| 2011/0157672 | A1 | 6/2011 | Liu et al. |
| 2011/0157674 | A1 | 6/2011 | Liu et al. |
| 2011/0317244 | A1 | 12/2011 | Liu et al. |

FOREIGN PATENT DOCUMENTS

| CN | 101923227 | 12/2010 |
| CN | 102116942 | 7/2011 |
| CN | 102116943 | 7/2011 |
| TW | 201020208 | 6/2010 |

* cited by examiner

*Primary Examiner* — James Jones
(74) *Attorney, Agent, or Firm* — Novak Druce Connolly Bove + Quigg LLP

(57) ABSTRACT

A thermochromatic element includes a sealed enclosure, an insulation layer and a first heating element. The insulation layer is received in the sealed enclosure, that divides the sealed enclosure into a first chamber and a second chamber. The first heating element is configured to heat the first chamber. The first heating element includes a carbon nanotube film including a number of carbon nanotube linear units and a number of carbon nanotube groups. Each carbon nanotube linear unit includes a number of first carbon nanotubes substantially oriented along a first direction, and are spaced from each other and substantially extending along the first direction. The carbon nanotube groups are combined with the carbon nanotube linear units by van der Waals force. The carbon nanotube groups between adjacent carbon nanotube linear units are spaced from each other in the first direction.

20 Claims, 13 Drawing Sheets

THERMOCHROMATIC ELEMENT AND THERMOCHROMATIC DISPLAY DEVICE

BACKGROUND

1. Technical Field

The present disclosure relates to a thermochromatic element and a thermochromatic display device using the same.

2. Discussion of Related Art

E-paper is a display technology without back light. E-paper can replace a traditional paper and can be used in advertisement, newspaper, books, and so on. Therefore, E-paper has a wide application for foreground purposes and a great commercial value.

At present, E-paper technology is mainly based on electrophoresis, wherein electric particles are used. The movement of the electric particles allows different images to be formed in the display. However, e-paper is restricted to black and white images and cannot show color images.

What is needed, therefore, is to provide a thermochromatic element and a thermochromatic display device that can overcome the above-described shortcomings.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
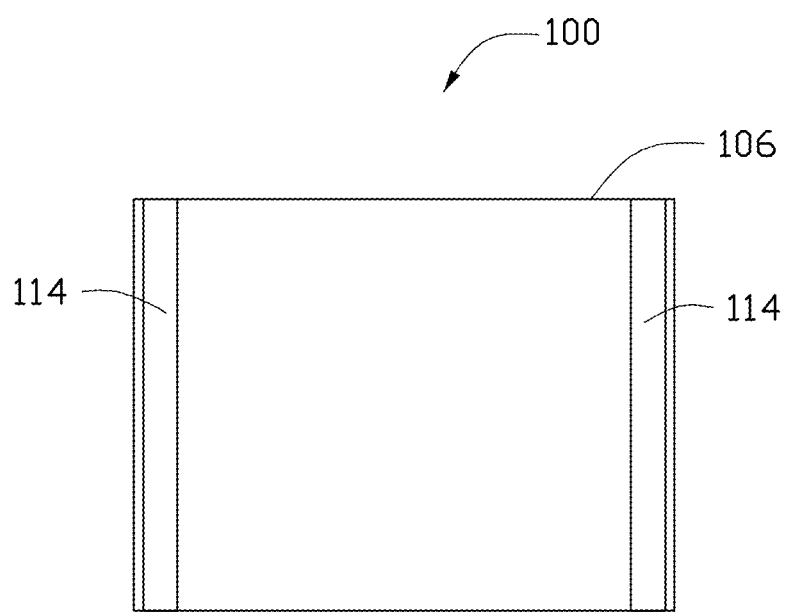
FIG. 1 is a schematic top plan view of one embodiment of a thermochromatic element.
Figure 2:
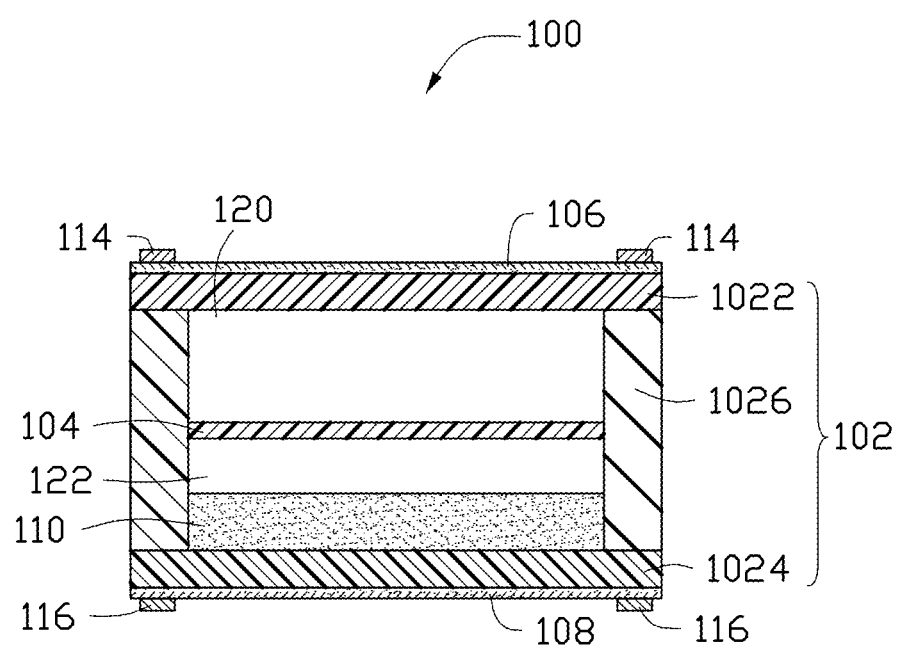
FIG. 2 is a cross-sectional side view of the thermochromatic element used in FIG. 1.

Referring to FIGS. 1 and 2, one embodiment of a thermochromatic element 100 is provided. The thermochromatic element 100 includes a sealed enclosure 102, an isolation layer 104, a first heating element 106, a second heating element 108, and a colorful material layer 110. The thermochromatic element 100 further includes at least two first electrodes 114 and at least two second electrodes 116. The isolation layer 104 is located in the sealed enclosure 102 and divides the sealed enclosure 102 into two separate chambers, namely a first chamber 120 and a second chamber 122. The first heating element 106 is configured to heat the first chamber 120, and the second heating element 108 is configured to heat the second chamber 122. The at least two first electrodes 114 are electrically connected with the first heating element 106. The at least two second electrodes 116 are electrically connected with the second heating element 108. The first heating element 106 and the second heating element 108 asynchronously produce heat, and the colorful material layer 110 moves between the first heating element 106 and the second heating element 108 in response to the heat produced by the first heating element 106 and the second heating element 108.

A shape of the sealed enclosure 102 can be cube or cylinder. In one embodiment according to FIG. 2, the sealed enclosure 102 of the thermochromatic element 100 has a cube structure. The sealed enclosure 102 includes an upper sheet 1022 used as a display surface, a lower sheet 1024, and four side sheets 1026. The four side sheets 1026 are located between the upper sheet 1022 and the lower sheet 1024 to form the cubic sealed enclosure 102. The upper sheet 1022 is insulated and transparent. A material of the upper sheet 1022 can be glass or transparent polymer. The transparent polymer includes polyethylene terephthalate, polyimide, polystyrene, polypropylene, polyethylene, polychloroprene, and PVC. The lower sheet 1024 and the side sheets 1026 are made of insulated materials, such as ceramic, resin, or plastic. The upper sheet 1022 and the lower sheet 1024 can also be in arc shapes. When both the upper sheet 1022 and the lower sheet 1024 are transparent, the thermochromatic element 100 can be a dual display element.

The isolation layer 104 is configured to separate the first chamber 120 from the second chamber 122. Gas can flow through the isolation layer 104 from the first chamber 120 to the second chamber 122. The isolation layer 104 is an opaque layer. Particularly, the isolation layer 104 can have a light color or white color. In one embodiment, shown in FIG. 2, the isolation layer 104 is a film structure and suspended in the sealed enclosure 102. The encircling ridge of the isolation layer 104 can be fixed on the side sheets 1026 with adhesive or some mechanical means. The ridge of the isolation layer 104 can also be embedded in the side sheets 1026. According to the embodiment, as shown in FIG. 2, the isolation layer 104 is square and parallel with the upper sheet 1022 and the lower sheet 1024. The isolation layer 104 is fixed on the side sheets 1026 with adhesive. The isolation layer 104 includes a plurality of micropores to make sure that gas can flow through the isolation layer 104 from the first chamber 120 to the second chamber 122. The isolation layer 104 can be a semi-permeable membrane, such as a cell wall film, a bladder film, or parchment. The isolation layer 104 can be a porous substrate with other materials deposited in the pores, such as unglazed ceramic with copper hexacyanoferrate. A thickness of the isolation layer 104 can be in a range from about 1 micrometer to about 1 millimeter. In one embodiment, the isolation layer 104 is parchment with a thickness of 100 micrometers.

Figure 3:
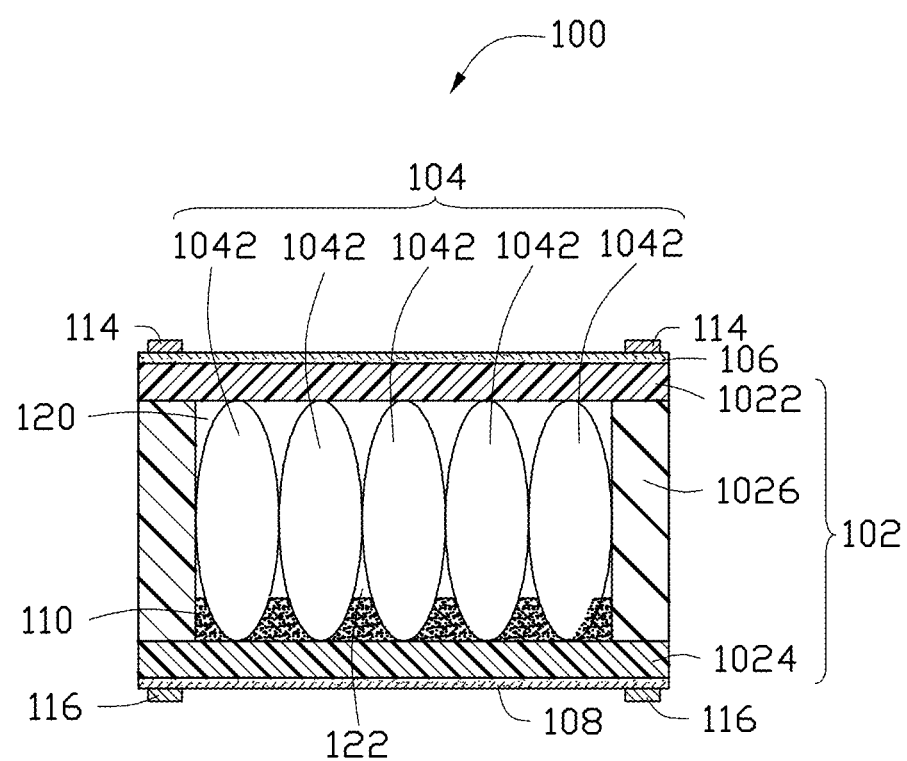
FIG. 3 is a cross-sectional side view of the thermochromatic element.

Referring to FIG. 3, the isolation layer 104 includes a plurality of spacers 1042 in the sealed enclosure 102. Each of the spacers 1042 has a shape with two peaked ends, such as oval or hexahedron shape. These spacers 1042 are located side by side in the enclosure 102. The two peak ends of each spacer 1042 separately contact the upper sheet 1022 and the lower sheet 1024. The middle portions of these spacers 1042 contact with each other, such that only gas can pass through the isolation layer 104. The ends of these spacers 1042 keep distances from each other, such that the first chamber 120 is defined by the upper sheet 1022, the isolation layer 104 and upper portions of the four side sheets 1026. The second chamber 122 is defined by the lower sheet 1024, the isolation layer 104, and lower portions of the four side sheets 1026. A material of the spacers 1042 can be ceramic, plastic, or silicon dioxide.

The size and the shape of the first chamber 120 and the second chamber 122 can be same or different. The size and the shape are determined by the distance between the upper sheet 1022 and the isolation layer 104 and the distance between the four side sheets 1026. In one embodiment, shown in FIG. 2, the first chamber 120 and the second chamber 122 have the same dimensions.

The colorful material layer 110 is solid or liquid and will become gas when it reaches its gasification temperature. Particularly, a material of the colorful material layer 110 is solid and sublimates easily, such as iodine, or naphthalin. A material of the colorful material layer 110 can also be a colored liquid, such as bromine. When the colorful material layer 110 is heated to a temperature higher than its gasification temperature, it will become gas and can flow between the first chamber 120 to the second chamber 122. When the colorful material layer 110 is located in the first chamber 120, color of the colorful material layer 110 is visible through the upper sheet 1022. When the colorful material layer 110 is located in the second chamber 122, because the isolation layer 104 is an opaque layer, color of the colorful material layer 110 is not visible.

The first heating element 106 is located on a surface of the upper sheet 1022. The upper sheet 1022 includes a first upper surface and a first lower surface opposite the first upper surface. The first lower surface is located in the first chamber 120. The first heating element 106 can be located on the first upper surface or the first lower surface of the upper sheet 1022. The first heating element 106 should be transparent and can be a carbon nanotube sheet-shaped structure. The second heating element 108 is located on a surface of the lower sheet 1024. The lower sheet 1024 includes a second upper surface and a second lower surface opposite the second upper surface. The second upper surface is located in the second chamber 122. The second heating element 108 can be located in the second upper surface or the second lower surface. The second heating element 108 can be a metal film, an ITO film or a carbon nanotube structure including carbon nanotubes arranged in an orderly or disorderly manner. In the present embodiment according to FIGS. 2 and 3, the first heating element 106 is located on the first upper surface of the upper sheet 1022, and the second heating element 108 is located on the second lower surface of the lower sheet 1024.

The carbon nanotube sheet-shaped structure includes a number of carbon nanotubes. In one embodiment, the carbon nanotube structure consists of the carbon nanotubes. The carbon nanotube structure is a free standing structure. "Freestanding structure" means that the carbon nanotube film does not have to be supported by a substrate and can sustain the weight of itself when it is hoisted by a portion thereof, without tearing. The carbon nanotube structure includes at least one carbon nanotube film. The structure of the carbon nanotube film can be the carbon nanotube films 1060, 1070, shown in FIGS. 4-7.

Figure 4:
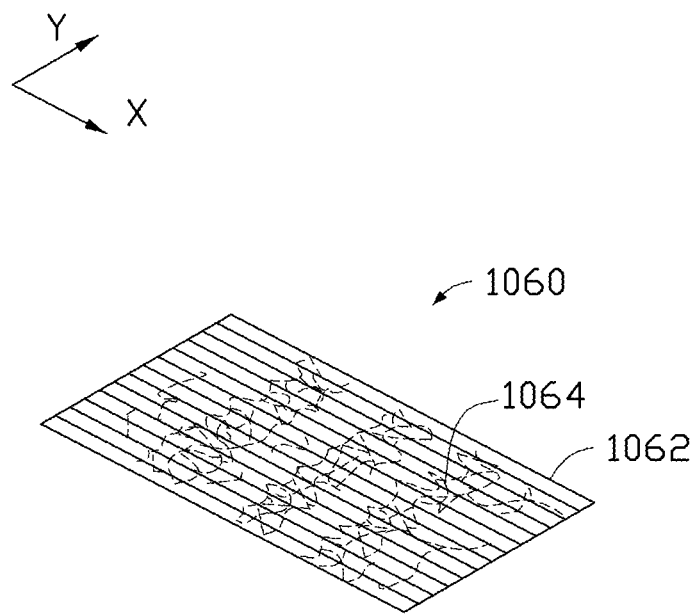
FIG. 4 is a schematic view of a carbon nanotube film including a number of carbon nanotube groups arranged as an array.
Figure 5:
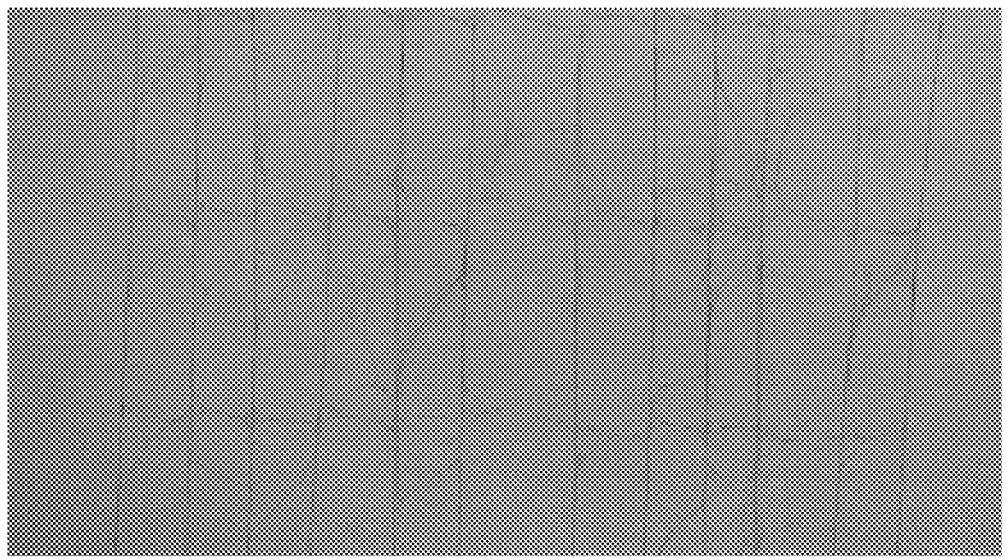
FIG. 5 is an optical microscope image of the carbon nanotube film shown in FIG. 4.
Figure 6:
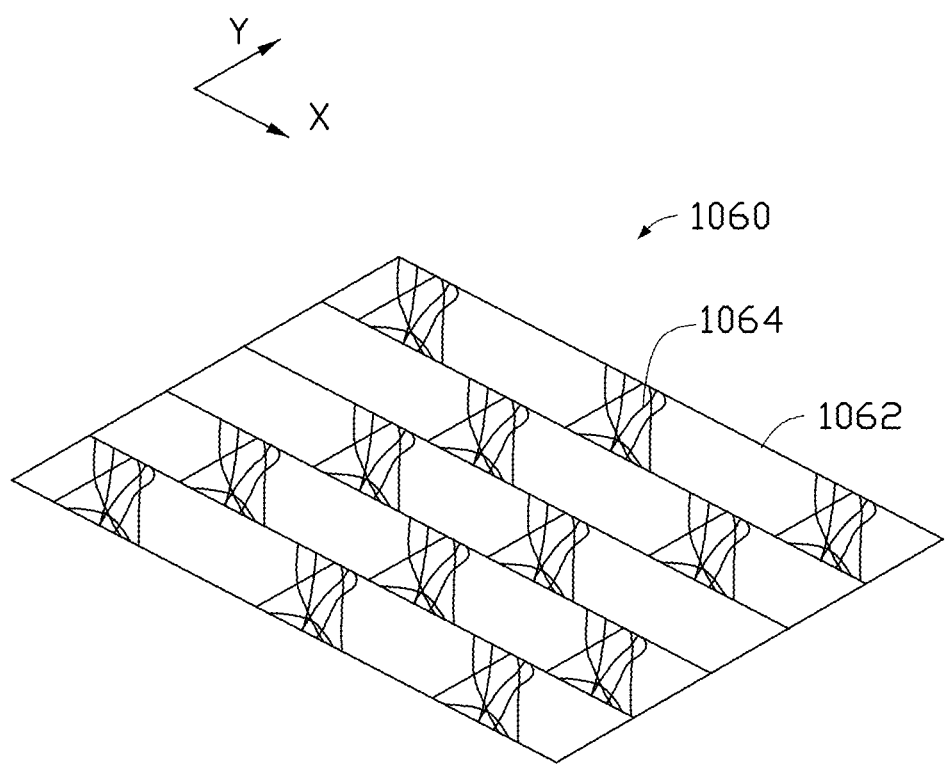
FIG. 6 is a schematic view of a carbon nanotube film including a number of carbon nanotube groups interlacedly arranged.

Referring to FIG. 4 and FIG. 5, the carbon nanotube film 1060 includes a number of carbon nanotube linear units 1062 and a number of carbon nanotube groups 1064. The carbon nanotube linear units 1062 are spaced from each other. The carbon nanotube groups 1064 join with the carbon nanotube linear units 1062 by van der Waals force. The carbon nanotube groups 1064 located between adjacent carbon nanotube linear units 1062 are spaced from each other.

Each carbon nanotube linear unit 1062 includes a number of first carbon nanotubes extending substantially along a first direction X. Adjacent first carbon nanotubes extending substantially along the first direction X are joined end to end by van der Waals attractive force. In one embodiment, an axis of each carbon nanotube linear unit 1062 is substantially parallel to the axes of first carbon nanotubes in each carbon nanotube linear unit 1062. The carbon nanotube linear units 1062 substantially extend along the first direction X, and are separated from each other in a second direction Y which crosses with the first direction X.

An intersection shape of each carbon nanotube linear unit 1062 can be a semi-circular, circular, elliptic, an oblate spheroid, or other shape. In one embodiment, the carbon nanotube linear units 1062 are substantially parallel to each other. Distances between adjacent carbon nanotube linear units 1062 are substantially equal. The carbon nanotube linear units 1062 are substantially coplanar. An effective diameter of each carbon nanotube linear unit 1062 is larger than or equal to 0.1 micrometers, and less than or equal to 100 micrometers. In one embodiment, the effective diameter of each carbon nanotube linear unit 1062 is equal to or larger than 5 micrometers, and not more than 50 micrometers. A distance between adjacent two carbon nanotube linear units 1062 is not limited and can be selected as desired. In one embodiment, the distance between adjacent two carbon nanotube linear units 1062 is greater than 0.1 millimeters. Diameters of the carbon nanotube linear units 1062 can be selected as desired. In one embodiment, the diameters of the carbon nanotube linear units 1062 are substantially equal.

The carbon nanotube groups 1064 are separated from each other and are combined with adjacent carbon nanotube linear units 1062 by van der Waals force in the second direction Y, so that the carbon nanotube film 1060 is a free-standing structure. The carbon nanotube groups 1064 are alternated with the carbon nanotube linear units 1062 in the second direction Y. In one embodiment, the carbon nanotube groups 1064 arranged in the second direction Y are separated from each other by the carbon nanotube linear units 1062. The carbon nanotube groups 1064 arranged in the second direction Y can connect with the carbon nanotube linear units 1062.

The carbon nanotube group 1064 includes a number of second carbon nanotubes joined by van der Waals force. Axes of the second carbon nanotubes can be substantially parallel to the first direction X or to the carbon nanotube linear units 1062. The axes of the second carbon nanotubes can also be crossed with the first direction X or with the carbon nanotube linear units 1062 such that the second carbon nanotubes in each carbon nanotube group 1064 are intercrossed into a network structure.

The axes of second carbon nanotubes and the first direction X define a number of first angles. Each first angle can be greater than or equal to 0 degrees, and less than or equal to 90 degrees. In one embodiment, the first angle is greater than or equal to 45 degrees, and less than or equal to 90 degrees. In another embodiment, the first angle is greater than or equal to 60 degrees, and less than or equal to 90 degrees.

In one embodiment, referring to FIG. 5, the carbon nanotube groups 1064 can be interlacedly located in the second direction Y and arranged in a disorderly fashion in the second direction Y. As such, the carbon nanotube groups 1064 in the second direction Y form non-linear conductive paths. In one embodiment, referring to FIG. 4, the carbon nanotube groups 1064 are arranged into a number of columns in the second direction Y, thus the carbon nanotube groups 1064 form consecutive and linear conductive paths in the second direction. In one embodiment, the carbon nanotube groups 1064 in the carbon nanotube film are arranged in an array. A length of each carbon nanotube group 1064 in the second direction Y is substantially equal to the distance between adjacent carbon nanotube linear units 1062. The length of each carbon nanotube group 1064 in the second direction Y is greater than 0.1 millimeters. The carbon nanotube groups 1064 are also spaced from each other along the first direction X. Spaces between adjacent carbon nanotube groups 1064 in the first direction X are greater than or equal to 1 millimeter.

Therefore, the carbon nanotube film includes a number of carbon nanotubes. The carbon nanotubes can be formed into carbon nanotube linear units 1062 and carbon nanotube groups 1064. In one embodiment, the carbon nanotube film consists of the carbon nanotubes. The carbon nanotube film defines a number of apertures. Specifically, the apertures are mainly defined by the separate carbon nanotube linear units 1062 and the spaced carbon nanotube groups 1064. The arrangement of the apertures is similar to the arrangement of the carbon nanotube groups 1064. In the carbon nanotube film, if the carbon nanotube linear units 1062 and the carbon nanotube groups 1064 are orderly arranged, the apertures are also orderly arranged. In one embodiment, the carbon nanotube linear units 1062 and the carbon nanotube groups 1064 are substantially arranged in an array, thus the apertures are also arranged in an array.

A ratio between a summation area of the carbon nanotube linear units 1062 and the carbon nanotube groups 1064 and a summation area of the apertures is less than or equal to 1:19. In other words, in the carbon nanotube film 1060, a ratio of the area of the carbon nanotubes to the area of the apertures is less than or equal to 1:19. In one embodiment, in the carbon nanotube film 1060, the ratio of the summation area of the carbon nanotube linear units 1062 and the carbon nanotube groups 1064 to the summation area of the apertures is less than or equal to 1:49. Therefore, a transparence of the carbon nanotube film 1060 is greater than or equal to 95%. In one embodiment, the transparence of the carbon nanotube film 1060 is greater than or equal to 98%.

The carbon nanotube film 1060 is an anisotropic conductive film. The carbon nanotube linear units 1062 form first conductive paths along the first direction, as the carbon nanotube linear units 1062 extend along the first direction X. The carbon nanotube groups 1064 combined with the carbon nanotube linear units on the second direction form second conductive paths along the second direction Y. The second conductive paths can be curved, as the carbon nanotube groups are interlacedly arranged. The second conductive paths can be linear, as the carbon nanotube groups are arranged as a number of columns and rows. Therefore, a resistance of the carbon nanotube film 1060 in the first direction X is different from a resistance of the carbon nanotube film 1060 in the second direction Y. The resistance of the carbon nanotube film 1060 in the second direction Y is 10 times greater than the resistance of the carbon nanotube film 1060 in the first direction X. In one embodiment, the resistance of the carbon nanotube film 1060 in the second direction Y is 20 times greater than the resistance of the carbon nanotube film 1060 in the first direction X. In one embodiment, the resistance of the carbon nanotube film 1060 in the second direction Y is about 50 times greater than the resistance of the carbon nanotube film 1060 in the first direction X. In the carbon nanotube film 1060, the carbon nanotube linear units 1062 are joined by the carbon nanotube groups 1064 in the second direction Y, which makes the carbon nanotube film 1060 strong and stable, and not broken easily.

There can be a small number of carbon nanotubes surrounding the carbon nanotube linear units and the carbon nanotube groups in the carbon nanotube film. However, these few carbon nanotubes have a small and negligible effect on the carbon nanotube film properties.

The carbon nanotube film 1060 can be made by the following steps: providing an original carbon nanotube film including a number of carbon nanotubes substantially extending along a first direction and joined end to end by van der Waals force; forming a patterned carbon nanotube film by patterning the original carbon nanotube film to define at least one row of through holes arranged in the original carbon nanotube film along the first direction, each row of the through holes including at least two spaced though holes; and treating the patterned carbon nanotube film with a solvent such that the patterned carbon nanotube film is shrunk into the carbon nanotube film. The solvent can be an organic solvent with a high volatility, such as alcohol, methanol, acetone, dichloroethane, or chloroform.

Figure 7:
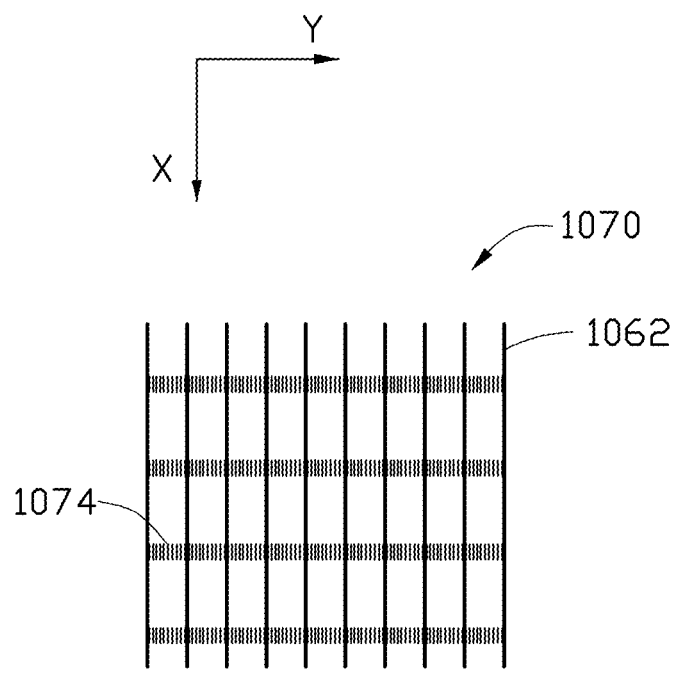
FIG. 7 is a schematic view of a carbon nanotube film including a number of carbon nanotubes substantially oriented along a same direction.
Figure 8:
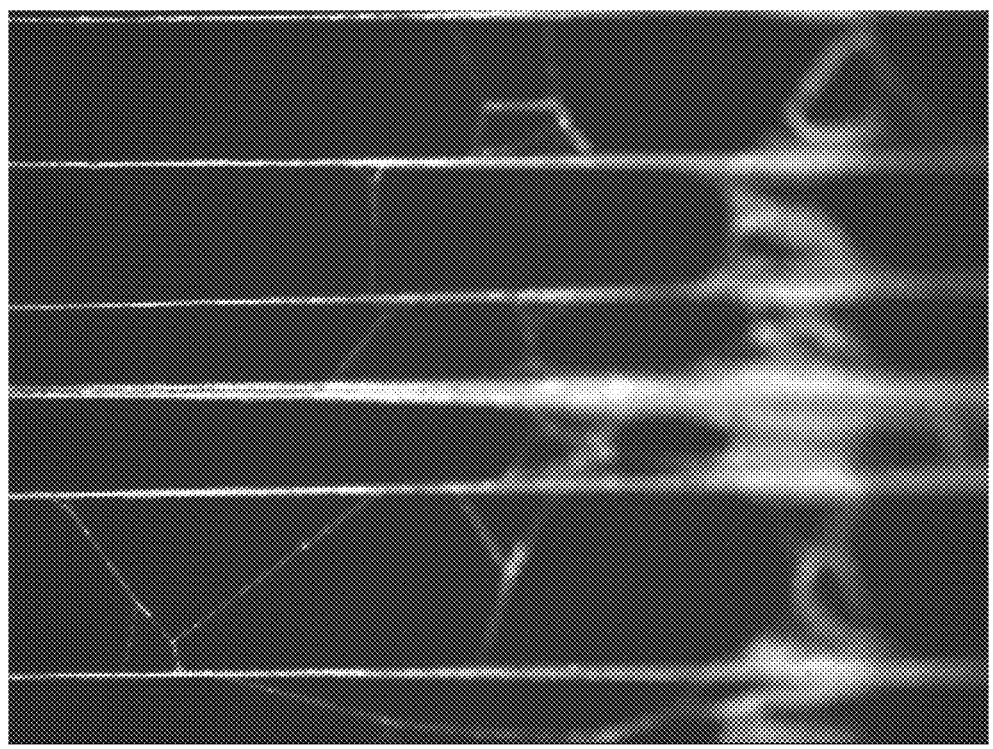
FIG. 8 is an optical microscope image of the carbon nanotube film shown in FIG. 7.

Referring to FIG. 7 and FIG. 8, the carbon nanotube film 1070 includes a number of carbon nanotubes. The carbon nanotube film 1070 includes the carbon nanotube linear units 1062 and a number of second carbon nanotube groups 1074. Each carbon nanotube group 1074 includes a number of second carbon nanotubes extending along a direction which defines a second angle with the first direction X. The second angle can be greater than or equal to 0 degrees and less than or equal to 45 degrees. In one embodiment, the second angle is greater than or equal to 0 degrees and less than or equal to 30 degrees. In another embodiment, the carbon nanotubes in each carbon nanotube group 1074 are substantially parallel to the first direction X and to the axes of the carbon nanotube linear units 1062. As such, the carbon nanotubes of the carbon nanotube film 1070 substantially extend along a same direction.

In addition, in the carbon nanotube film 1070, there are still a few carbon nanotubes surrounding the carbon nanotube linear units 1062 and the carbon nanotube groups 1074, owing to the limitations of a method for making the carbon nanotube structure.

The method for making the carbon nanotube film 1070 is similar to the method for making the carbon nanotube film 1060. The difference is that the solvent used for treating the patterned carbon nanotube film has a weak interfacial tension. The solvent can be water, or a mixture of water and organic solvent.

The carbon nanotube sheet-shaped structure can include a number of the carbon nanotube films. The carbon nanotube films can be stacked with each other or arranged side by side. The carbon nanotube linear units in each two adjacent carbon nanotube films can define an angle ranged from about 0 degrees to about 90 degrees.

The carbon nanotube sheet-shaped structure as the first heating element 106 has the following advantages. The carbon nanotube sheet-shaped structure mainly includes the carbon nanotubes. The carbon nanotubes are not easily oxidized, and are electrically conductive, and chemically and mechanically stable, even if the carbon nanotubes are moist. As such, the first heating element 106 will also keep a low resistance, a chemical and mechanical stability, even if the first heating element 106 is moist. Therefore, the life span of the first heating element 106 is long. Because the carbon nanotubes have a low density, the first heating element 106 is light itself, and the weight of the thermochromatic element 100 is light. The carbon nanotube sheet-shaped structure is flexible and can be arbitrarily folded without being broken, thus the thermochromatic element 100 can be a flexible structure. As the heat capacity of the carbon nanotube layer structure is low, the temperature of the first heating element 106 using the carbon nanotube sheet-shaped structure can rise and fall quickly, and has a high response heating speed. Thus, the thermochromatic element 100 also has a quick response, a high heating efficiency, and accuracy. In addition, the transparence of the carbon nanotube film is greater than or equal to 95%, possibly even greater than 98%, the first heating element 106 using the carbon nanotube film is transparent, so the thermochromatic element 100 has high, non-frosted, clarity of definition. The clarity of definition of the thermochromatic display device using the thermochromatic element 10 is also high.

The at least two first electrodes 114 are used to electrically connect the first heating element 106 with the external circuit, which creates Joule heating in the first heating element 106. The at least two first electrodes 114 can be fixed on the surface of the first heating element 106 by conductive adhesive (not shown). The at least two first electrodes 114 are made of conductive material. The shapes of the at least two first electrodes 114 are not limited and can be lamellar-shaped, rod-shaped, wire-shaped, or block-shaped. The cross sectional shape of the two first electrodes 114 can be round, square, trapezium, triangular, or polygonal. The thickness of the two first electrodes 114 can be any size, depending on the design, and can be about 1 micrometer to about 1 centimeter. In the present embodiment as shown in FIGS. 1 and 2, the two first electrodes 114 both have a linear shape, and are located on the surface of the first heating element 106. The two first electrodes 114 are substantially parallel with each other. The two first electrodes 114 are electrically connected with the carbon nanotube linear units 1062 of the carbon nanotube film and located on two opposite ends of the carbon nanotube linear units 1062. Further, the two first electrodes 114 can be electrically connected with the external circuit via two electrodes wires (not shown). The at least two first electrodes 114 can be a number of first electrodes 114 located on two opposite sides of the first heating element 106.

The at least two second electrodes 116 electrically connect the second heating element 108 with the external circuit, which makes the second heating element 108 also experience Joule heating. The at least two second electrodes 116 can be fixed on the surface of the second heating element 108 by conductive adhesive (not shown). The material and the shape of the second electrodes 116 can be the same as the first electrodes 114. The relationship between the second electrodes 116 and the second heating element 108 can be the same as the relationship between the first electrodes 114 and the first heating element 106. Further, the two first electrodes 114 can be electrically connected with the external circuit via two electrodes wires (not shown).

In use of the thermochromatic element 100, if the colorful material layer 110 is located in the first chamber 120, the upper sheet 1022 is transparent, and color of the colorful material layer 110 will be visible through the upper sheet 1022. If a voltage is applied to the two first electrodes 114, the first heating element 106 heats the colorful material layer 110 until it becomes gas. In the gaseous colorful material layer 110 will then migrate into the second chamber 122. Because temperature in the second chamber 122 is low, the colorful material layer 110 will return to a solid or liquid state. And then, the color of the colorful material layer 110 will disappear. This stage is shown in FIG. 2. If a voltage is applied to the two second electrodes 116 and the voltage applied to the two first electrodes 114 is turned off, the second heating element 108 heats the second chamber 122, and the colorful material layer 110 becomes gaseous again. The gaseous colorful material layer 110 passes through the isolation layer 104 to the first chamber 120. As such, the thermochromatic element 100 can show the color again through the upper sheet 1022. Because the colorful material layer 110 is colorful, the thermochromatic material element 100 can show many colors.

Figure 9:
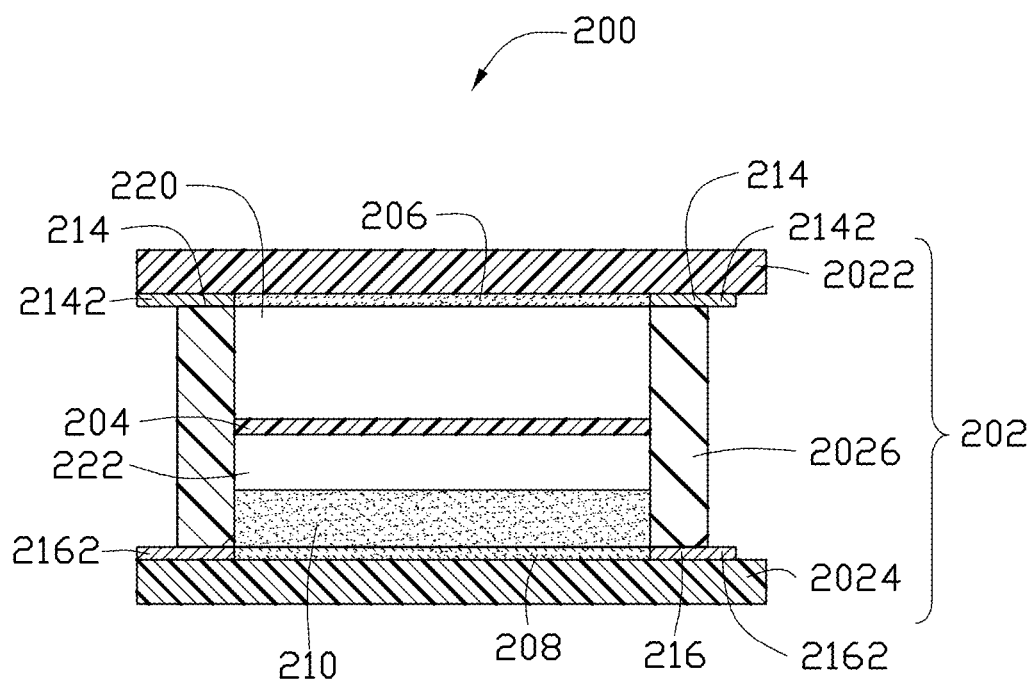
FIG. 9 is a schematic view of one embodiment of a thermochromatic element.

Referring to FIG. 9, one embodiment of a thermochromatic element 200 is provided. The thermochromatic element 200 includes a sealed enclosure 202, an isolation layer 204, a first heating element 206, a second heating element 208, a colorful material layer 210, a first chamber 220 and a second chamber 222. The thermochromatic element 200 further includes at least two first electrodes 214 and at least two second electrodes 216. The sealed enclosure 202 includes an upper sheet 2022, a lower sheet 2024 and four side sheets 2026. The upper sheet 2022 includes a first upper surface (not labeled) and a second lower surface (not labeled). The lower sheet 2024 includes a second upper surface (not labeled) and a second lower surface (not labeled).

The first heating element 206 is located on the first lower surface of the upper sheet 2022. The second heating element 208 is located on the second upper surface of the lower sheet 2024. The first heating element 206 can immediately contact with the colorful material layer 210. The second heating element 208 can immediately contact with the absorbing layer 212. Each of the first electrodes 214 includes a first extend portion 2142 extending to the out of the sealed enclosure 202. Each of the second electrodes 216 includes a second extending portion 2162 extending to the out of the sealed enclosure 202. The first extending portion 2142 can make the first heating element 206 electrically connect with the external circuit easily. The second extending portion 2162 enables the second heating element 208 electrically connect with the external circuit easily.

Other characteristics of the thermochromatic element 200 are similar to the thermochromatic element 100 disclosed above.

Figure 10:
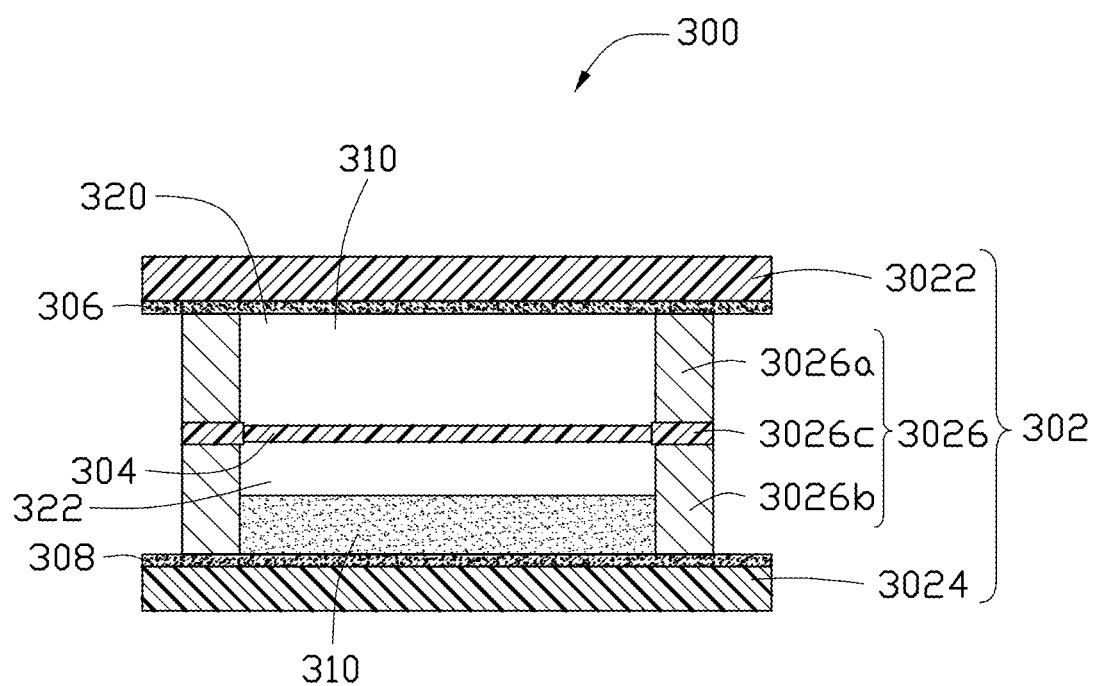
FIG. 10 is a schematic view of one embodiment of a thermochromatic element.

Referring to FIG. 10, one embodiment of a thermochromatic element 300. The thermochromatic element 300 includes a sealed enclosure 302, an isolation layer 304, a first heating element 306, a second heating element 308, a colorful material layer 310, a first chamber 320 and a second chamber 322. The sealed enclosure 302 includes an upper sheet 3022, a lower sheet 3024, two first side sheets 3026 and two second side sheets (not shown). The two first side sheets 3026 are opposite to each other. The two second side sheets are opposite to each other. The two second side sheets are made of insulated material.

Each of the two first side sheets 3026 includes a first conductive portion 3026a, a second conductive portion 3026b and an insulated layer 3026c. The insulated layer 3026c is located between the first conductive portion 3026a and the second conductive portion 3026b. The first conductive portion 3026a and the second conductive portion 3026b are insulated from each other via the insulated layer 3026c. The first conductive portion 3026a is electrically connected with the first heating element 306. The second conductive portion 3026b is electrically connected with the second heating element 308. In one embodiment according to FIG. 8, each of the first conductive portions 3026a is located on a surface of the first heating element 306, each of the second conductive portions 3026b is located on a surface of the second heating element 308. The first conductive portion 3026a is used as an electrode of the thermochromatic element 300 and make the first heating element 306 electrically connected with external circuit. The second conductive portion 3026b is used as an electrode of the thermochromatic element 300 and make the second heating element 308 electrically connected with external circuit.

Other characteristics of the thermochromatic element 300 are similar to the thermochromatic element 200 disclosed above.

Figure 11:
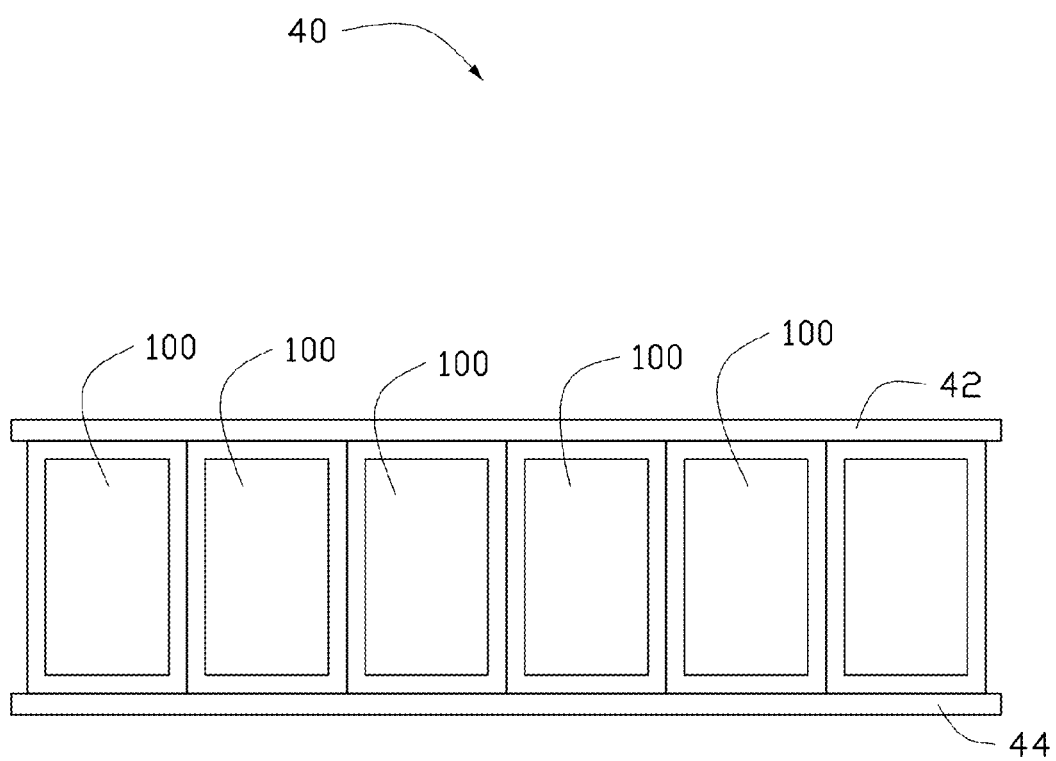
FIG. 11 is a schematic view of one embodiment of a thermochromatic display device including a first electrode sheet and a second electrode sheet.

Referring to FIG. 11, one embodiment of a thermochromatic display device 40 is provided. The thermochromatic display device 40 includes a first electrode sheet 42, a second electrode sheet 44, and a plurality of thermochromatic elements 100 located between the first electrode sheet 42 and the second electrode 44. The structure of the thermochromatic element 100 has been discussed above.

Figure 12:
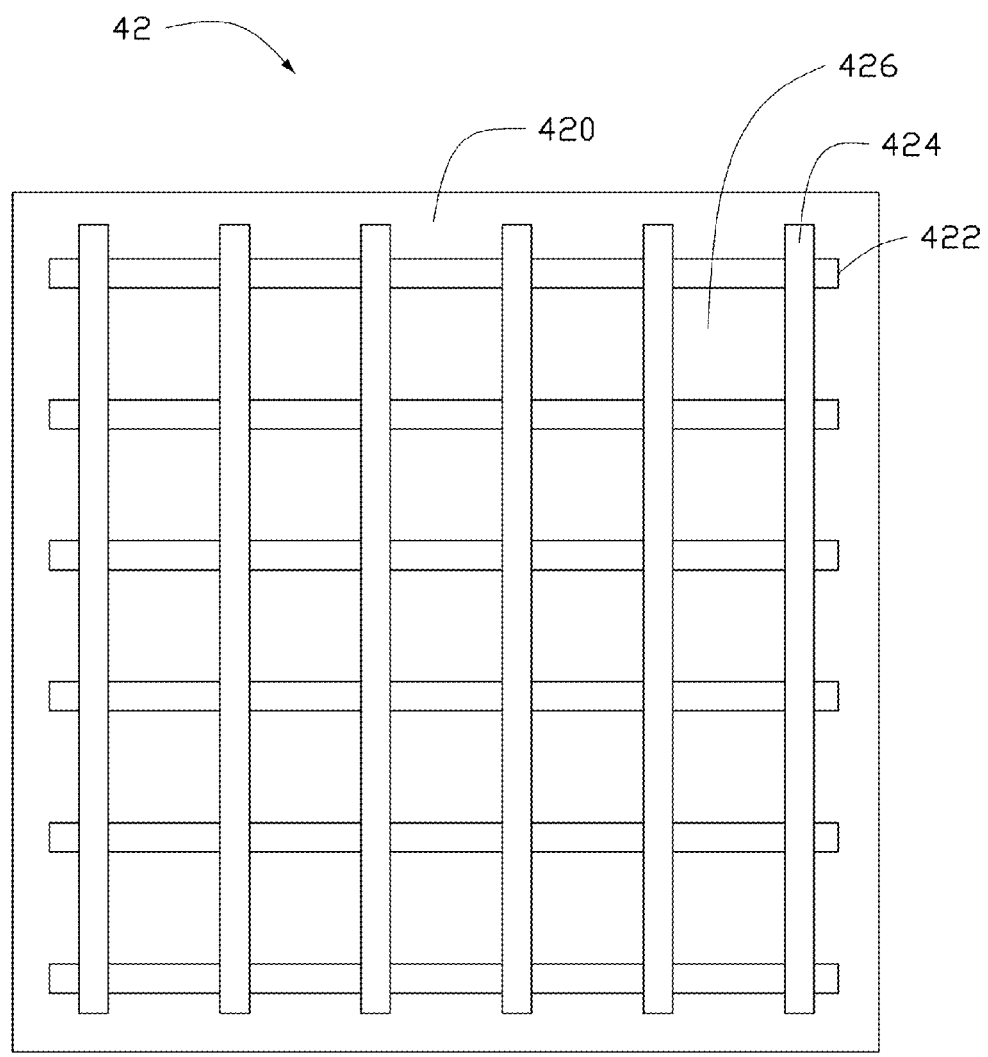
FIG. 12 is a schematic top plan view of the first electrode sheet used in the thermochromatic element in FIG. 11.

Referring to FIG. 12, the first electrode sheet 42 is a transparent sheet and includes a first surface 420. The first electrode sheet 42 includes a plurality of first row electrodes 422 and a plurality of first line electrodes 424. The plurality of first row electrodes 422 and the plurality of first line electrodes 424 are located on the first surface 420. The plurality of first row electrodes 422 and the plurality of first line electrodes 424 are insulated from each other. The plurality of first row electrodes 422 and the plurality of first line electrodes 424 are crossed with each other to form a electrode cell including a plurality of first electrode cells 426.

Figure 13:
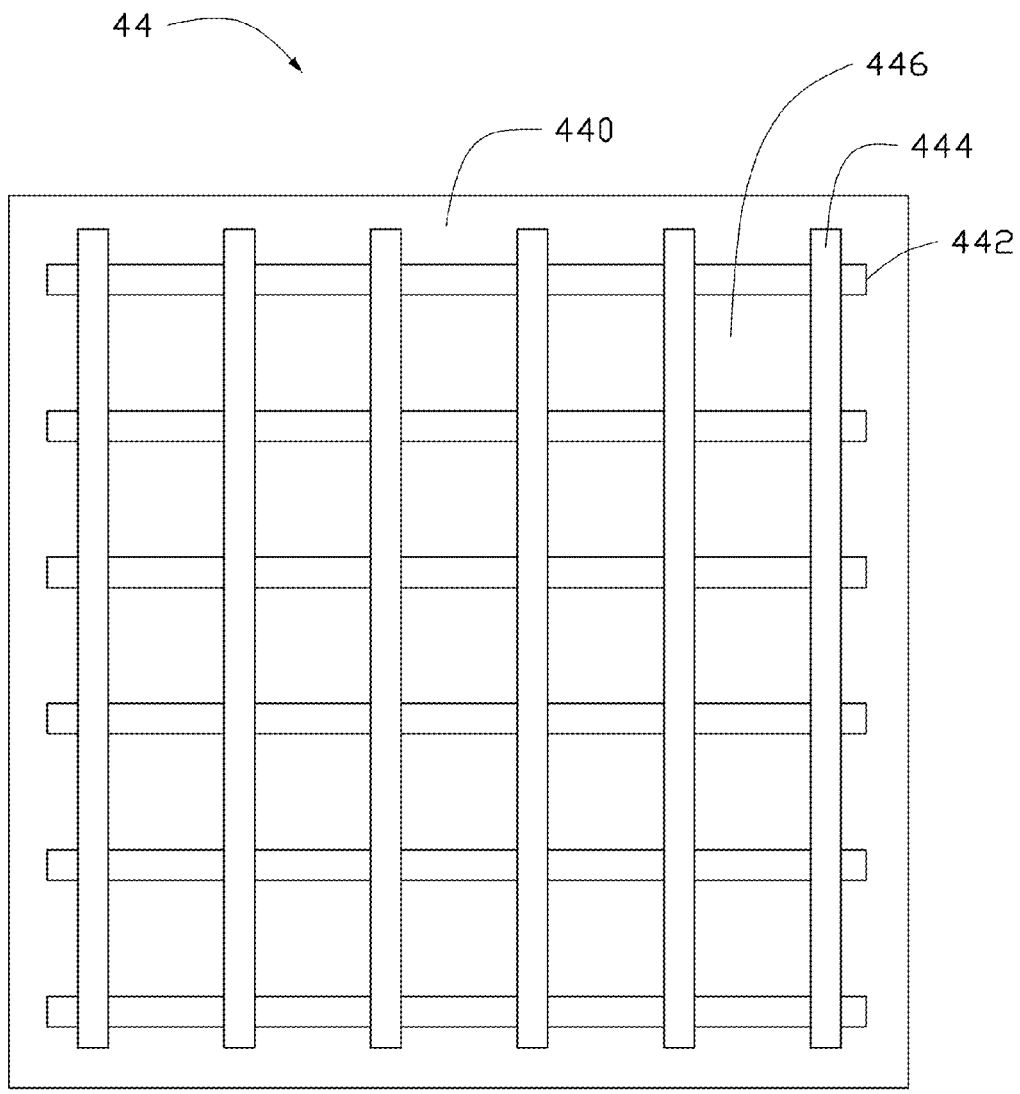
FIG. 13 is a schematic top plan view of the second electrode sheet used in the thermochromatic element in FIG. 11.

Referring to FIG. 13, the second electrode sheet 44 includes a second surface 440, a plurality of second row electrodes 442, a plurality of second line electrodes 444 and a plurality of second electrode cells 446. The structure of the second electrode sheet 44 is the same as the first electrode sheet 42. The second electrode sheet 44 can be transparent or opaque. When the second electrode sheet 44 is transparent, the thermochromatic display device 40 is a dual display device.

The first surface 420 of the first electrode sheet 42 faces the second surface 440 of the second electrode sheet 44. The first electrode cells 426 and the second electrode cells 446 are arranged oppositely with each other in a one-to-one manner. Each first electrode cell 426 and each second electrode cell 446 opposite with each other from a display unit. Each display unit includes one thermochromatic element 100. Referring also to FIG. 2, the upper sheet 1022 of each thermochromatic element 100 is located on the first surface 420 and in one first electrode cell 426, the lower sheet 1024 is located on the second surface 440 and in one second electrode cell 446 opposite the first electrode cell 426. The two first electrodes 114 of the thermochromatic element 100 are separately electrically connected with the first row electrode 422 and the first line electrode 424 forming the electrode cell 426 in which the thermochromatic element 100 located. The two second electrodes 116 of the thermochromatic element 100 are separately electrically connected with the second row electrode 442 and the second line electrode 444 forming the electrode cell 446 in which the thermochromatic element 100 located.

The thermochromatic display device 40 further includes at least one supporter (not shown) located between the first electrode sheet 42 and the second electrode sheet 44. The at least one supporter maintains a distance between the first electrode sheet 42 and the second electrode sheet 44. The at least one supporter can prevent the thermochromatic element 100 from being pressed by the first electrode sheet 42 and the second electrode 44.

The thermochromatic display device 40 can control each thermochromatic element 100 via the first electrode sheet 42 and the second electrode sheet 44 to show color or wipe color. By controlling different thermochromatic element 100, the thermochromatic display device 40 can show different information or menu.

It is to be understood that the above-described embodiment is intended to illustrate rather than limit the disclosure. Variations may be made to the embodiment without departing from the spirit of the disclosure as claimed. The above-described embodiments are intended to illustrate the scope of the disclosure and not to restrict the scope of the disclosure.

It is also to be understood that the above description and the claims drawn to a method may include some indication in reference to certain steps. However, the indication used is only to be viewed for identification purposes and not as a suggestion as to an order for the steps.

What is claimed is:

1. A thermochromatic element, comprising:
    a sealed enclosure comprising an upper transparent sheet;
    an isolation layer received in the sealed enclosure, that divides the sealed enclosure into a first chamber and a second chamber; and the first chamber defined between the upper transparent sheet and the isolation layer;
    a first heating element configured to heat the first chamber;
    a second heating element configured to heat the second chamber; and
    a colorful material layer located in the first chamber or the second chamber, wherein the colorful material layer is movable between the first chamber and the second chamber in a gaseous state through the isolation layer,
    wherein the first heating element comprises a carbon nanotube film comprising:
        a plurality of carbon nanotube linear units spaced from each other and substantially extending along a first direction, and each of the plurality of carbon nanotube linear units comprising a plurality of first carbon nanotubes that are substantially oriented along the first direction; and
        a plurality of carbon nanotube groups combined with the plurality of carbon nanotube linear units by van der Waals force, and wherein the plurality of carbon nanotube groups between adjacent two of the plurality of carbon nanotube linear units are spaced from each other in the first direction.

2. The thermochromatic element of claim 1, wherein the plurality of carbon nanotube linear units are substantially parallel to each other and form a plurality of first conductive paths along the first direction.

3. The thermochromatic element of claim 1, wherein the plurality of carbon nanotube groups are interlacedly arranged along a second direction, that intersects with the first direction.

4. The thermochromatic element of claim 1, wherein the plurality of carbon nanotube groups are arranged to form a plurality of columns.

5. The thermochromatic element of claim 1, wherein each carbon nanotube linear unit comprises a plurality of first carbon nanotubes joined end-to-end by van der Waals force along the first direction.

6. The thermochromatic element of claim 1, wherein each carbon nanotube group comprises a plurality of second carbon nanotubes substantially extending along the first direction.

7. The thermochromatic element of claim 1, wherein each carbon nanotube group comprises a plurality of second carbon nanotubes intercrossed with each other to form a net structure.

8. The thermochromatic element of claim 1, wherein the plurality of carbon nanotube groups are alternated with the plurality of carbon nanotube linear units along a second direction, that intersects with the first direction.

9. The thermochromatic element of claim 1, wherein the carbon nanotube film defines a plurality of apertures.

10. The thermochromatic element of claim 9, wherein a ratio of a sum surface area of the plurality of carbon nanotube linear units and the plurality of carbon nanotube groups to a sum surface area of the plurality of apertures is less than or equal to 1:19.

11. The thermochromatic element of claim 10, wherein the ratio of the sum surface area of the plurality of carbon nanotube linear units and the plurality of carbon nanotube groups to the sum surface area of the plurality of apertures is less than or equal to 1:49.

12. The thermochromatic element of claim 1, wherein the sealed enclosure is formed by the upper transparent sheet, a lower sheet opposite to the upper transparent sheet, and four side sheets connected with the upper transparent sheet and the lower sheet.

13. The thermochromatic element of claim 12, wherein the four side sheets consists of two first side sheets face each other and two second side sheets face each other; each of the two first side sheets comprises a first conductive portion electrically connected with the first heating element, a second conductive portion electrically connected with the second heating element, and an insulated layer located between the first conductive portion and the second conductive portion; and the two second side sheets are made of insulated material.

14. The thermochromatic element of claim 12, wherein the isolation layer is fixed by the four side sheets, the first chamber is defined by the upper transparent sheet and the isolation layer, and the second chamber is defined by the isolation layer and the lower sheet.

15. The thermochromatic element of claim 1, further comprising two first electrodes and two second electrodes; wherein the two first electrodes are spaced from each other and electrically connected with the first heating element, and the two second electrodes are spaced from each other and electrically connected with the second heating element.

16. A thermochromatic display device, comprising:
a first electrode sheet comprising a plurality of first row electrodes and a plurality of first line electrodes, the plurality of first row electrodes crossed with the plurality of first line electrodes to form a plurality of first electrode cells;
a second electrode sheet facing the first electrode sheet and comprising a plurality of second row electrodes and a plurality of second line electrodes, the plurality of second row electrodes crossed with the plurality of second line electrodes to form a plurality of second electrode cells, the plurality of second electrode cells corresponding to the plurality of first electrode cells in a one-by-one manner to form a plurality of display cells; and
a plurality of thermochromatic elements located in the plurality of display cells in a one-by-one manner and located between the first electrode sheet and the second electrode sheet; each of the plurality of thermochromatic elements comprising:
a sealed enclosure comprising an upper transparent sheet;
an isolation layer received in the sealed enclosure, that divides the sealed enclosure into a first chamber and a second chamber, the first chamber defined between the upper transparent sheet and the isolation layer;
a first heating element configured to heat the first chamber, the first heating element comprising a carbon nanotube film comprising:
a plurality of carbon nanotube linear units spaced from each other and substantially extending along a first direction, each of the plurality of carbon nanotube linear units comprising a plurality of first carbon nanotubes that are substantially oriented along the first direction; and
a plurality of carbon nanotube groups combined with the plurality of carbon nanotube linear units by van der Waals force, wherein the plurality of carbon nanotube groups between adjacent two of the plurality of carbon nanotube linear units are spaced from each other in the first direction;
a second heating element configured to heat the second chamber; and
a colorful material layer located in the first chamber or the second chamber, wherein the colorful material layer is movable between the first chamber and the second chamber in a gaseous state through the isolation layer,
wherein in each of the plurality of thermochromatic elements, the first heating element is electrically connected with the one of the plurality of first row electrodes and one of the plurality of first line electrodes; and the second heating element is electrically connected with the one of the plurality of second row electrodes and one of the plurality of second line electrodes.

17. The thermochromatic display device of claim 16, wherein the plurality of carbon nanotube linear units are substantially parallel to each other, and the plurality of carbon nanotube groups are arranged to form a plurality of columns.

18. The thermochromatic display device of claim 17, wherein the plurality of carbon nanotube groups are alternated with the plurality of carbon nanotube linear units along a second direction intersected with the first direction.

19. The thermochromatic display device of claim 16, wherein the carbon nanotube film defines a plurality of apertures.

20. The thermochromatic display device of claim 19, wherein a ratio of a sum surface area of the plurality of carbon nanotube linear units and the plurality of carbon nanotube groups to a sum surface area of the plurality of apertures is less than or equal to 1:19.

* * * * *